(12) United States Patent
Wu et al.

(10) Patent No.: US 8,482,765 B2
(45) Date of Patent: Jul. 9, 2013

(54) SCAN TEMPLATES EXTENSION TO A WS-ENABLED SCANNER

(75) Inventors: Yuwen Wu, Sunnyvale, CA (US); Yi Ding, Saratoga, CA (US)

(73) Assignee: Ricoh Company, Ltd., Tokyo (JP)

( * ) Notice: Subject to any disclaimer, the term of this patent is extended or adjusted under 35 U.S.C. 154(b) by 1036 days.

(21) Appl. No.: 12/340,668

(22) Filed: Dec. 20, 2008

(65) Prior Publication Data
US 2010/0157384 A1  Jun. 24, 2010

(51) Int. Cl.
*G06F 3/12* (2006.01)
(52) U.S. Cl.
USPC ........... 358/1.15; 358/1.9; 358/1.13; 358/2.1; 358/403; 358/474
(58) Field of Classification Search
None
See application file for complete search history.

(56) References Cited

U.S. PATENT DOCUMENTS

| | | | | |
|---|---|---|---|---|
| 5,768,483 A | * | 6/1998 | Maniwa et al. | 358/1.15 |
| 7,301,659 B2 | * | 11/2007 | Timperman et al. | 358/1.15 |
| 2004/0070613 A1 | * | 4/2004 | Sprague et al. | 345/762 |
| 2005/0279835 A1 | * | 12/2005 | Groeneboer et al. | 235/472.01 |
| 2006/0215224 A1 | * | 9/2006 | Matsumoto | 358/1.18 |
| 2006/0256392 A1 | * | 11/2006 | Van Hoof et al. | 358/402 |
| 2009/0031313 A1 | * | 1/2009 | Tian | 718/102 |

OTHER PUBLICATIONS

"Scan Service Definition Version 1.0" Nov. 9, 2006 Microsoft Corporation (101 pages).
"WS-Scan Device Implementation" Windows Vista, Spring 2008, Redmond, Washington (23 pages).

* cited by examiner

*Primary Examiner* — Miya J Cato
(74) *Attorney, Agent, or Firm* — Hickman Palermo Truong Becker Bingham Wong LLP; Daniel D. Ledesma

(57) ABSTRACT

Techniques are provided for extending a WS-enabled scanner. A client device sends a request for multiple scan ticket templates that the WS-enabled scanner maintains. A WS scan module, executing on the scanner, receives the request and forwards the request to a scan templates handler (STH). The STH invokes a routine of a scan templates manager (STM). The STM retrieves, in response to the invocation of the routine, a plurality of scan ticket templates. The STM sends the plurality of scan ticket templates to the STH, which forwards the plurality to the WS scan module. The WS scan module composes a response message that includes the plurality of scan ticket templates and sends the response message to the client device.

17 Claims, 6 Drawing Sheets

SCAN TICKET TEMPLATE 500

```
<rst:ScanTemplate>
    <rst:ScanTemplateName>PHOTO</wscn:ScanTemplateName>
    <wscn:ScanTicket>
        <wscn:DocumentParameters>
            <wscn:Format>tiff-single-uncompressed</wscn:Format>
            <wscn:ImagesToTransfer>1</wscn:ImagesToTransfer>
            <wscn:InputSource>ADF</wscn:InputSource>
            <wscn:FilmScanMode>NotApplicable</wscn:FilmScanMode>
            <wscn:ContentType>Auto</wscn:ContentType>
            <wscn:InputSize>
                <wscn:DocumentSizeAutoDetect>true</wscn:DocumentSizeAutoDetect>
            </wscn:InputSize>
            <wscn:Exposure>
                <wscn:ExposureSettings>
                    <wscn:Contrast>0</wscn:Contrast>
                    <wscn:Brightness>0</wscn:Brightness>
                    <wscn:Sharpness>0</wscn:Sharpness>
                </wscn:ExposureSettings>
            </wscn:Exposure>
            <wscn:Scaling>
                <wscn:ScalingWidth>100</wscn:ScalingWidth>
                <wscn:ScalingHeight>100</wscn:ScalingHeight>
            </wscn:Scaling>
            <wscn:Rotation>0</wscn:Rotation>
            <wscn:MediaSides>
                <wscn:MediaFront>
                    <wscn:ColorProcessing>RGB24</wscn:ColorProcessing>
                    <wscn:Resolution>
                        <wscn:Width>600</wscn:Width>
                        <wscn:Height>600</wscn:Height>
                    </wscn:Resolution>
                </wscn:MediaFront>
            </wscn:MediaSides>
        </wscn:DocumentParameters>
    </wscn:ScanTicket>
</rst:ScanTemplate>
```

FIG. 5

SCAN TEMPLATES EXTENSION TO A WS-ENABLED SCANNER

FIELD OF THE INVENTION

The present invention relates to extending a Web service scan service to support the maintenance of multiple scan ticket templates.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A scan ticket is a set of scan settings for scanning a document. The scan settings dictate how a document is to be scanned by a scan device. Some (or all) of the final scan settings in a scan ticket may be default settings that a user does not modify when the user creates a scan job, which includes the scan ticket. Non-limiting examples of scan settings include contrast, resolution, color, scale, orientation, and simplex/duplex printing.

For many users, selecting a scan ticket for a particular scan job is not easy. Many users do not understand how each setting would affect the final scan result. Even if a user finalizes the scan settings for scanning one type of document (e.g., text documents), if the user then desires to scan a photograph, then the user must learn a new set of scan settings for scanning the photograph in a desired manner. Typically, scanning a text document requires different settings (and thus a different scan ticket) than scanning a photograph.

To compound the problem, in an enterprise environment where users may have access to multiple scanners, different scanners typically have different capabilities. For example, one scanner may have a higher resolution capability than other scanners. As another example, one scanner may be capable of scanning in color while other scanners only scan in black and white. Thus, scanning a document on one scanner may require a different set of scan settings than scanning the document on another scanner in order to achieve the same (or similar) desired outcome.

SUMMARY

Accordingly, scan ticket templates are introduced to assist a user in choosing proper scan settings for different types of documents on different scan devices. According to an embodiment of the invention, a scan device comprises a scan module and a scan ticket templates manager. The scan module is configured to implement a Web Services (WS) scan specification and cause an electronic version of a printed document to be generated at the scan device. The scan ticket templates manager is configured to manage scan ticket template data that corresponds to a plurality of scan ticket templates. Each of the plurality of scan ticket templates corresponds to a different set of default settings that are used by the scan device to indicate how the scan device is to scan a printed document. Also, each of two or more of the plurality of scan ticket templates corresponds to a different document type.

The scan module is further configured to (a) receive, from a client device via a network, a request for at least a portion of the scan ticket template data and (b) in response to the request, send the request to the scan ticket templates manager.

The scan ticket templates manager is further configured to, in response to the request: (a) retrieve a portion of the scan ticket template data, wherein the portion corresponds to one or more scan ticket templates of the plurality, and (b) send the portion to the scan module. The scan module is further configured to send to the portion to the client device.

BRIEF DESCRIPTION OF THE DRAWINGS

The present invention is illustrated by way of example, and not by way of limitation, in the figures of the accompanying drawings and in which like reference numerals refer to similar elements and in which:

FIG. 5 depicts an example scan ticket template, of a particular document type, that is sent to a client in response to the client's request for scan ticket template data, according to an embodiment of the invention.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided herein for assisting a user in creating a scan ticket. Users are assisting in creating scan tickets for different document types and/or purposes (e.g., fast scan versus high quality scan), even for different scan devices. A scan device provides multiple scan ticket templates that are based on the scan device's capabilities. A particular scan ticket template may be for the purpose of scanning, e.g., a text document, a photograph, or a postcard. If the scan device is Web Services (WS-) enabled, then the scan specification is extended to support the retrieval (and, optionally, creation and update) of multiple scan ticket templates. With the scan template extension, clients can retrieve multiple scan ticket templates from a scan device or retrieve a specific scan ticket template. The user interface on the client device can list and/or display the scan ticket template(s) accordingly. After a user selects a particular scan ticket template, the user creates a scan job using the selected template or creates a scan ticket based on the selected template.

Approaches described herein may take advantage of the fact that a particular scan device "knows" its capabilities better than a typical user knows the scan device's capabilities. As a result, the scan ticket templates maintained by a scan device may be tailored (e.g., "out of the box") depending on the capabilities of the scan device and the specific document type (e.g., text documents or photographs) and/or specific scan purpose (e.g., high quality scan or low quality scan). Therefore, rather than providing a single set of default scan settings to a client for all scan jobs, a scan device maintains multiple different scan ticket templates, one for each type of document and/or scan purpose.

Scan System Architecture

Figure 1:
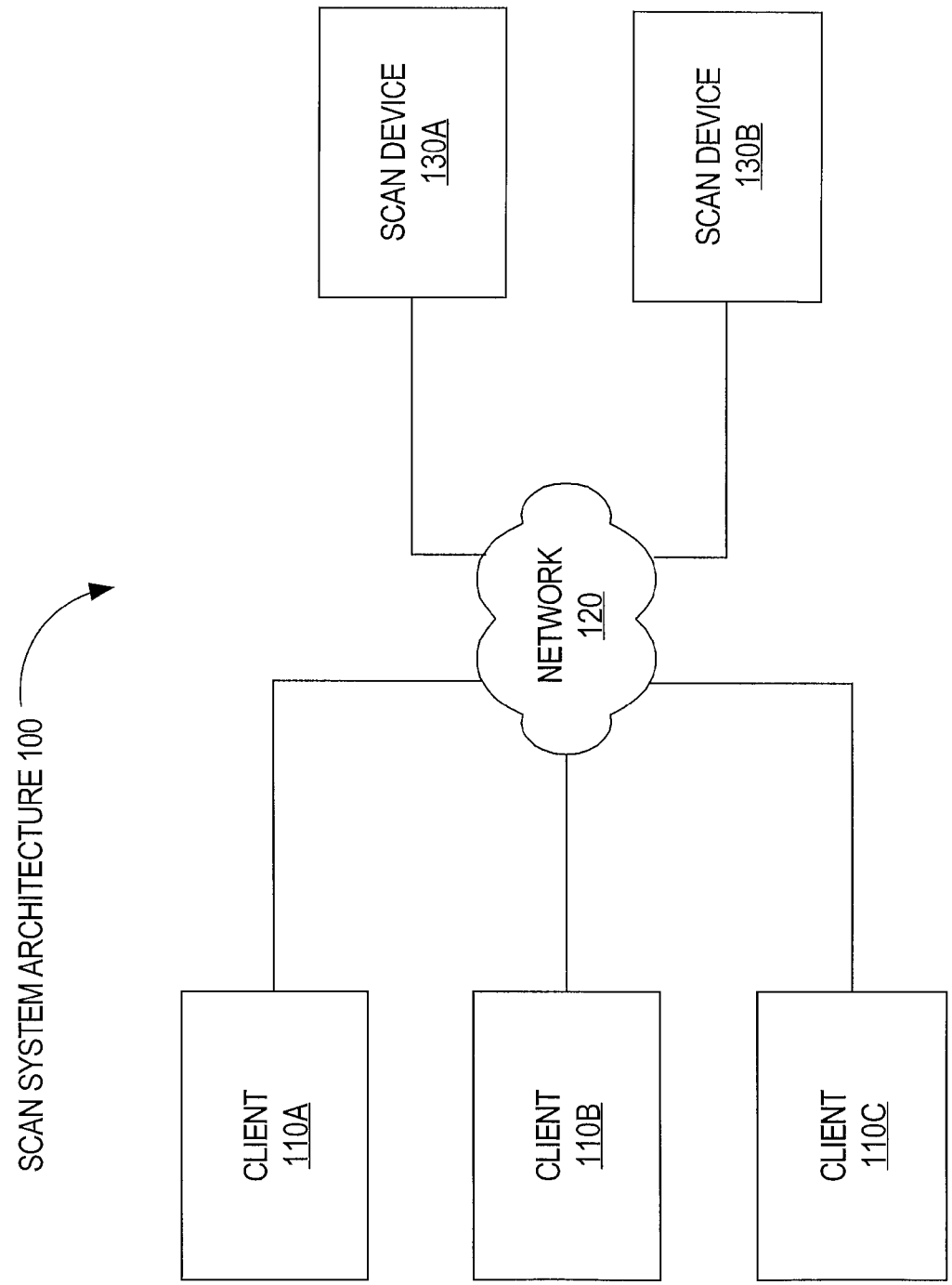
FIG. 1 is a block diagram that depicts an example scan system architecture, according to an embodiment of the invention.

FIG. 1 is a block diagram that depicts an example scan system architecture 100, according to an embodiment of the invention. Scan system architecture 100 comprises clients 110A-C, network 120, and scan devices 130A-B.

Each of clients 110A-C may be any client that is capable of requesting scan services from scan devices 130A-B. Non-limiting examples of clients 110A-C include personal computers, cell phones, and personal digital assistants (PDAs). Each of clients 110A-C includes a client application that is configured to request multiple scan ticket templates or one or more specified scan ticket templates.

A scan job may be initiated at a client device (e.g., client 110A) or at a scan device (e.g., scan device 130A). Embodiments of the invention are not limited to scan jobs being initiated at a particular device.

Clients 110A-C are communicatively coupled to scan devices 130A-B via network 120. Network 120 may be implemented by any medium or mechanism that provides for the exchange of data between clients 110A-C and scan devices 130A-B. Non-limiting examples of network 120 include one or more Local Area Networks (LANs), one or more Wide Area Networks (WANs), the Internet, or any combination thereof.

Scan Device

Figure 2:
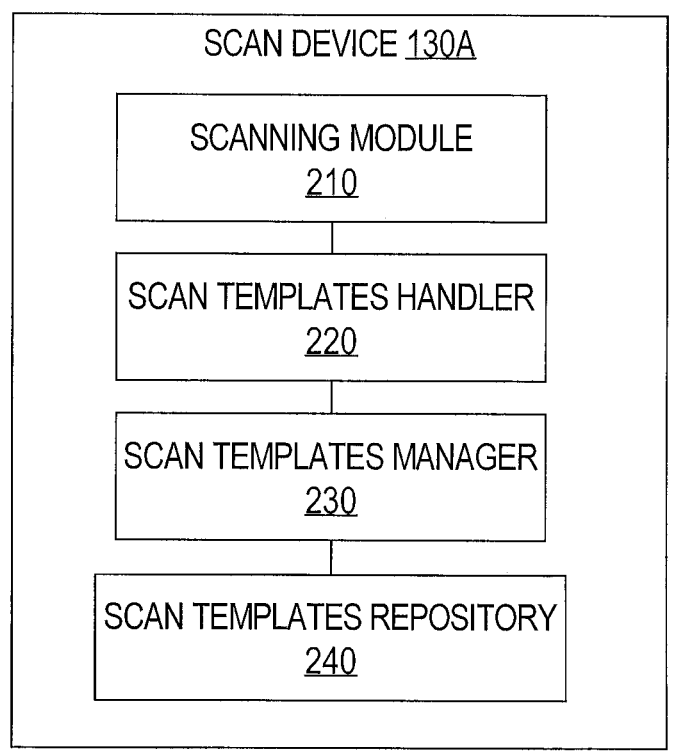
FIG. 2 is a block diagram that depicts various example modules that reside on a scan device, according to an embodiment of the invention.

FIG. 2 is a block diagram that depicts various example modules 210-230 that reside on a scan device, such as scan device 130A, according to an embodiment of the invention. Each of modules 210-230 may be implemented in computer software, computer hardware, or any combination of computer software and computer hardware.

Scan device 130A includes: a scanning module 210, a scan templates handler module (ST handler) 220, a scan templates manager module (ST manager) 230, and a scan templates repository (ST repository) 240.

Scanning module 210 comprises one or more modules and provides a scan service. Scanning module 210 implements a Web Services (WS) scan service specification that is standardized by a Web Services standardizing body. Web services are described in more detail below.

Scanning module 210 is configured to (a) receive, from a client device, a scan job that includes a scan ticket and (b) scan a document according to the settings indicated in the scan ticket. Scanning a document comprises causing an electronic version of the document to be generated according to the settings indicated (or specified) in a scan ticket. A document is any printed material that is capable of being scanned by a scan device. Non-limiting examples of documents include text documents, pictures, photographs, brochures, postcards, and identification cards.

ST repository 240 stores scan ticket template data. In an alternative embodiment, ST repository 240 resides on a device that is separate from scan device 130A and may be accessed over network 120 or another network. ST repository 240 may be a database or a file. Scan ticket template data may be stored in a variety of data formats, depending upon a particular limitation. Example formats include, without limitation, XML, HTML, and plain text.

The scan ticket template data corresponds to a plurality of scan ticket templates. Each of the plurality of scan ticket templates corresponds to a different set of default scan settings that are used by the scan device to indicate how the scan device is to scan a document. Also, each of two scan ticket templates corresponds to a different document type.

The scan ticket template data (or a portion thereof) may be stored on scan device 130A before the time of sale of scan device 130A, initially created by an administrator of scan device 130A, and/or downloaded onto scan device 130A from a remote site.

ST handler 220 interfaces with scanning module 210 and ST manager 230 by parsing a scan ticket templates request from scanning module 210, calling ST manager 230 for scan ticket template data, and returning the scan ticket template data to scanning module 210. In an embodiment, ST handler 220 also serializes the scan ticket template information, received from ST manager 230, in a defined format and sends the serialized information to scanning module 210.

ST manager 230 manages ST repository 240. In addition to retrieving scan ticket template data from ST repository 240, ST manager 230 is configured to create and/or update the scan ticket template data. In an embodiment, an administrator or end-user creates and updates scan ticket template data in ST repository 240 via a user interface to ST manager 230.

ST manager 230 uses location data to access the scan ticket template data in ST repository 240. Table 1 is an example of location data that ST manager 230 accesses in response to request for scan ticket template data:

TABLE 1

| Template Name | Location |
| --- | --- |
| Photo 4X4 | Loc1 |
| Fast Scan | Loc2 |
| General everyday scan | Loc3 |
| Text | Loc4 |
| Passport | Loc5 |

If all the scan ticket templates are stored in the same file (or table), then the location data in the "Location" column may indicate where in a particular file (or table) the corresponding scan ticket template is located. If the scan ticket templates are stored in different files (or tables), then the location data may indicate the name of the files (or tables) in which the corresponding scan ticket template is stored. Embodiments of the invention are not limited to how the scan ticket template data is stored.

In an embodiment, ST manager 230 is configured to modify (or create a separate copy of) one or more scan ticket templates in response a change in the capabilities of scan device 130A. For example, in response to the depletion of color ink, ST manager 230 creates a copy of each scan ticket template whose color/gray scale setting indicates "color" and changes the setting to "gray scale." Then, in response to scan ticket template data requests, ST manager 230 may retrieve, depending on the specific request, one or more scan ticket templates copies that ST manager 230 created based on the changed capabilities of scan device 130A. When a "lost" capability is restored, then ST manager 230 may remove the corresponding scan ticket template copies or store them for further use if the capability is changed in the future.

In a related embodiment, the functionality of ST handler 220 is incorporated into ST manager 230 or vice versa, in which case there is only one ST module instead of two.

MFP

A scan device, such as scan device 130A, may be a multi-function peripheral (MFP). A scan device that is an MFP is a device that provides one or more services in addition to a scan service, such as a print service, a fax service, a copy service, and/or an archive service. Thus, if a scan device is an MFP that also includes a print service, then the MFP includes a printing module that is configured to process print data and cause a printed version of an electronic document reflected in the print data to be printed on a tangible medium, such as paper. Like scanning module 210, the printing module may be implemented as computer hardware, compute software, or any combination of computer hardware and computer software.

Web Services

The World Wide Web Consortium ("W3C") is an international consortium that develops standards for the World Wide Web. The W3C defines a "web service" as a software system that is designed to support interoperable machine-to-machine interaction over a network. This definition encompasses many different systems, but in common usage, the term refers to those services that use Simple Object Access Protocol (SOAP)-formatted Extensible Markup Language ("XML") envelopes and that have their interfaces described using Web Services Description Language ("WSDL"). Web services allow devices and applications to communicate with each other over one or more networks without the intervention of any human being, while using the same suite of protocols (e.g., Hypertext Transfer Protocol ("HTTP")) that a human being would use to communicate with such devices and applications over one or more networks.

The specifications that define web services are intentionally modular, and, as a result, there is no one document that defines all web services. Instead, there are a few core specifications that are supplemented by other specifications as the circumstances and choice of technology dictate. Common core specifications are SOAP, WSDL, WS-Discovery, WS-MetadataExchange, WS-Addressing, and WS-Security. Different specifications address different tasks and functions.

SOAP is an XML-based, extensible message envelope format, with bindings to underlying protocols (e.g., HTTP and Simple Mail Transfer Protocol ("SMTP")). Using XML, SOAP defines how messages should be formatted, so that those messages are formatted in such a way that the recipients of those messages (devices and applications) can understand those messages. SOAP can be used to perform remote procedure calls, for example.

WSDL is an XML format that allows web service interfaces to be described along with the details of those interfaces' bindings to specific protocols. WSDL is typically used to generate server and client code, and for configuration.

In an embodiment, scanning module 210 implements the Devices Profile for Web Services (DPWS). DPWS may be a part of the WS scan specification that scanning module 210 implements. DPWS defines a minimal set of implementation constraints to enable secure Web Service messaging, discovery, description, and eventing on devices. The DPWS specification defines an architecture in which devices run two types of services: hosting services and hosted services. Hosting services are directly associated to a device and play an important part in the device discovery process. Hosted services are mostly functional and depend on their hosting device for discovery. DPWS builds on the following core Web Services standards: WSDL 1.1, XML Schema, SOAP 1.2, WS-Addressing, and further comprises WS-MetadataExchange, WS-Transfer, WS-Policy, WS-Security, WS-Discovery and WS-Eventing. The latest DPWS specification (published in February, 2006) is incorporated herein by reference as if fully disclosed herein.

In a related embodiment, the WS scan specification that scanning module 210 implements is standardized by W3C or another Web Services standardizing body, such as the Organization for the Advancement of Structured Information Standards (OASIS). Additionally or alternatively, the WS scan specification may be drafted and promoted by a certain company, such as Microsoft, whose operating system has built-in support for the specification. As a consequence, many scanner vendors may adopt the WS scan specification to better communicate with the company's scan client. The WS scan specification is extended to support multiple scan ticket templates.

Additionally, a client device (e.g., client 110A) may implements one or more WS specifications, one of which is extended to support the requesting of multiple scan ticket templates or of one or more specific templates.

Communication Between a Client and a Scan Device

Figure 3:
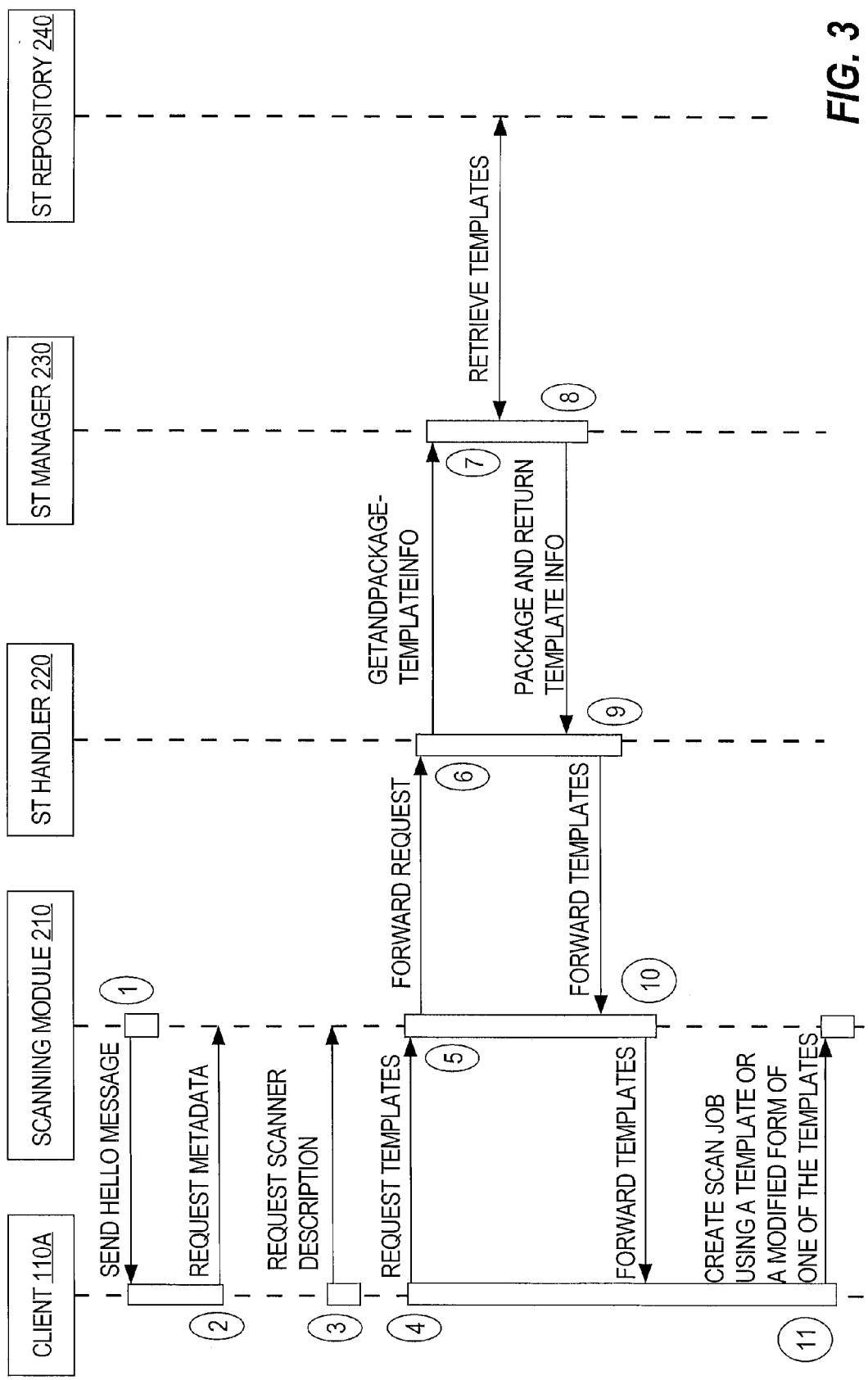
FIG. 3 is a sequence diagram that depicts a set of example communications for a client device obtaining a plurality of scan ticket templates that are maintained by a scan device, according to an embodiment of the invention.

FIG. 3 is a sequence diagram that depicts a set of example communications for a client device obtaining a plurality of scan ticket templates that are maintained by a scan device, according to an embodiment of the invention. FIG. 3 depicts communication between four entities: client 110A, scanning module 210, ST handler 220, and ST manager 230.

At step 1, scanning module 210 sends a HELLO message, which message is received by client 110A. The HELLO message may be a broadcast message or a multi-cast message that is sent into network 120. The message may conform to the WS-Discovery protocol, as defined by the WS-Discovery specification.

At step 2, in response to the HELLO message and as part of the WS-Discovery protocol, client 110A requests and receives metadata of scanning module 210.

At step 3, client 110A requests and receives a scanner description of scanning module 210. Scanner description includes information such as model, manufacture, and the service endpoint, which client 110A will use to communicate with the scan service for further operations, such as retrieving templates and creating scan jobs.

At step 4, client 110A requests, from scanning module 210, multiple scan ticket templates that are maintained by the scan device. In response to the request (at step 5), scanning module 210 forwards the request to ST handler 220. In response (at step 6), ST handler 220, in turn, deserializes the request and then calls a "GetAndPackageTemplateInfo" API function of ST manager 230. In response (at step 7), ST manager 230 retrieves a plurality of scan ticket templates from ST repository 240.

At step 8, ST manager 230 sends the plurality of scan ticket templates to ST handler 220. In response (at step 9), ST handler 220 serializes the template data and then forwards the serialized template data to scanning module 210. "Serialization" refers to the generation of a SOAP message that will include the template data.

At step 10, scanning module 210 sends the packaged data to client 110A. Client 110A displays, to a user, a list that identifies each of the plurality of scan ticket templates.

At step 11, in response to the user instructing client 110A to select one of the plurality of scan ticket templates, client 110A creates a scan job using the selected template and sends the scan job to scanning module 210. The user may or may not change the default settings in the selected scan ticket template. Thus, the user may first modify a selected template and then create a scan job based on that modified template.

In an embodiment, client 110A stores the plurality of scan ticket templates that are received from scanning module 210 for future use.

Communication Between a Client and a Device

Figure 4:
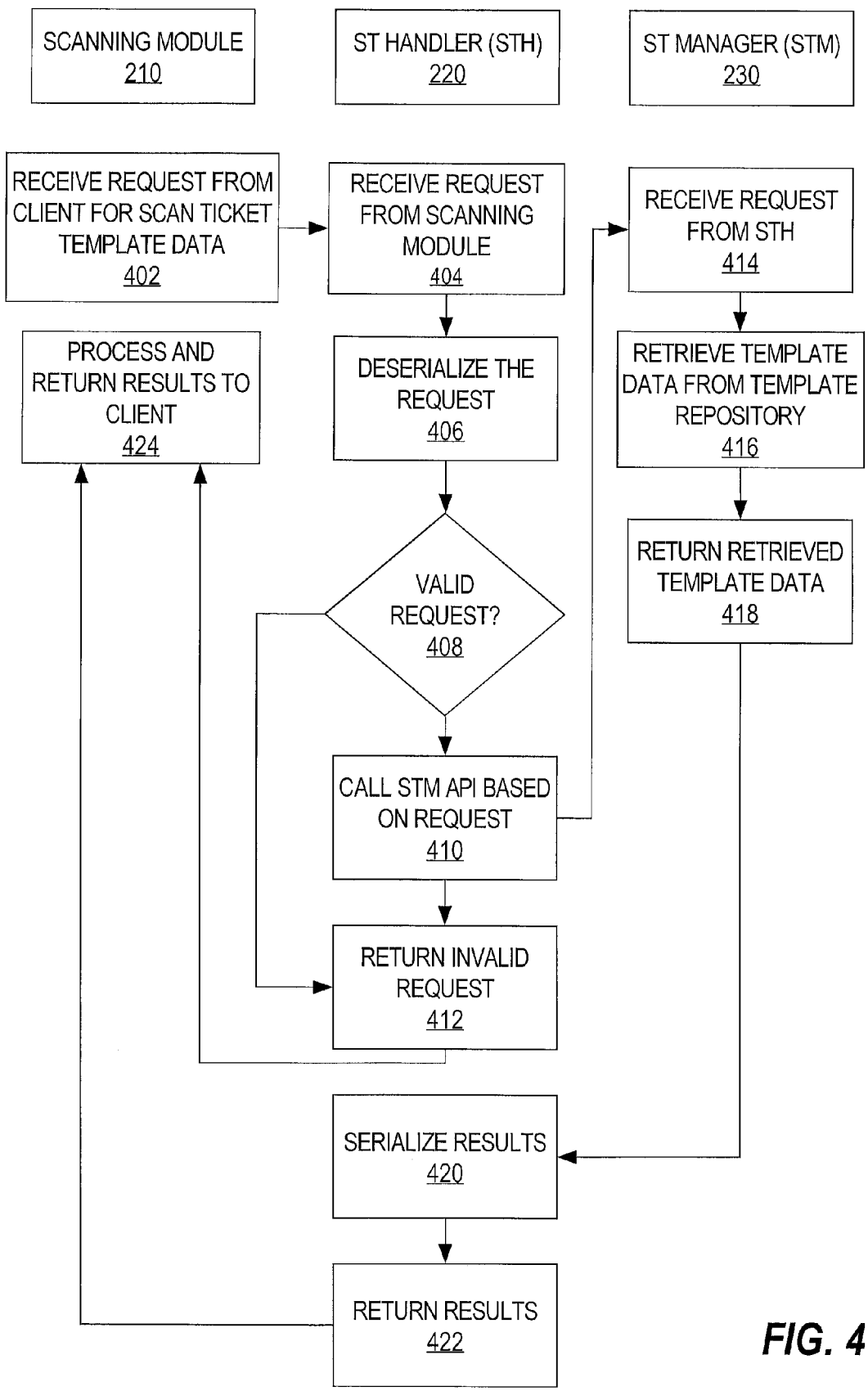
FIG. 4 is a flow diagram that depicts how a client request for scan ticket template data may be processed, according to an embodiment of the invention.

FIG. 4 is a flow diagram that depicts how a client request for scan ticket template data may be processed, according to an embodiment of the invention. FIG. 4 depicts three processes on a scan device (e.g., scan device 130A): scanning module 210, ST handler 220, and ST manager 230.

At step 402, scanning module 210 receives, from a client application executing on a client device (e.g., client 110A) a request at least a portion of scan ticket template data that scanning module 210 maintains. The request may be a SOAP request, i.e., that conforms to the SOAP protocol. The portion corresponds to one or more scan ticket templates. Specifically, the request may indicate that all scan ticket templates maintained by the scan device are requested without specifying any particular scan ticket template. Alternatively, the request may specify one or more particular scan ticket templates that are maintained by the scan device. Scanning module 210 also forwards the request to ST handler 220.

At step 404, ST handler 220 receives the request from scanning module 210. At step 406, ST handler 220 analyzes (or deserializes) the request to determine which template(s) is/are requested.

At step 408, ST handler 220 determines whether the request is valid. If the request is for one or more particular templates, then this determination may entail determining whether each particular template is supported or stored on the scan device. If the particular template is not supported by the scan device, then the request is invalid.

If the request is valid, then (at step 410) ST handler 220 calls an API of ST manager 230 and the process proceeds to step 414. If the request is invalid, then (at step 412) ST handler 220 generates a message that indicates that the request is invalid and sends to the request to scanning module 210.

At step 414, ST manager 230 is notified of the request via the API call invoked by ST handler 220 in step 410.

At step 416, ST manager 230 retrieves the requested scan ticket template data from a template repository, such as ST repository 240.

At step 418, ST manager 230 returns the requested scan ticket template data to ST handler 220.

At step 420, ST handler 220 serializes the requested scan ticket template data received from ST manager 230.

At step 422, ST handler 220 returns the serialized results to scanning module 210.

At step 424, scanning module 210 processes the serialized results and returns the results to the client.

Scan Ticket Template

Each scan ticket template that a scan device maintains corresponds to a different set of default scan settings. The scan settings indicated in a finalized scan ticket dictate how a scanner scans a document. Some of the scan settings may not be adjustable. For example, if a scan device is not capable of scanning documents in color, then each of the templates maintained on the scan device indicate that the color is "gray scale" or "black/white." What client can see for each scan setting is based on the capabilities of the scan device. Thus, if a scan device has no color capability, then the user will not see color in the selection list. Therefore, the user cannot select it.

FIG. 5 depicts an example scan ticket template 500, of a particular document type, that is sent to a client in response to the client's request for scan ticket template data, according to an embodiment of the invention. According to this example, Template 500 is for documents of type "PHOTO" (i.e., photographs). Also, template 500 is formatted in XML. The outer tag of template 500 is "ScanTemplate," which has two "children" tags: "ScanTemplateName" and "ScanTicket." The "ScanTicket" template has a single child tag entitled "DocumentParameters," which refers to the default scan settings for documents of type "PHOTO." Within the "DocumentParameters" tag, multiple scan settings are indicated and defined, such as the format, the number of images to transfer, the input source, exposure (which includes contrast, brightness, and sharpness), scaling, rotation, color, and resolution.

Implementation Mechanisms

Figure 6:
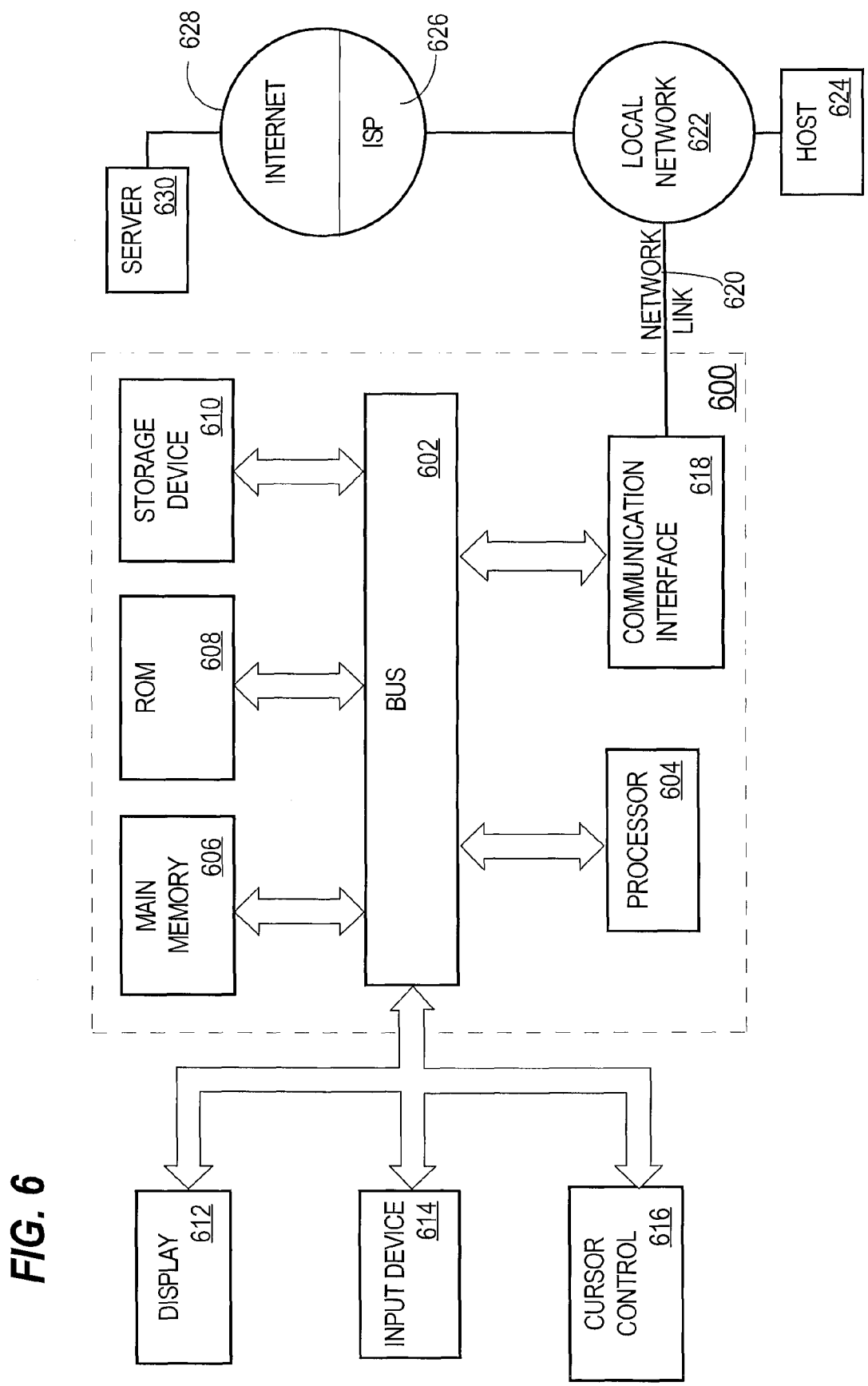
FIG. 6 is a block diagram that illustrates a computer system upon which an embodiment of the invention may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another machine-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 600, various machine-readable media are involved, for example, in providing instructions to processor 604 for execution. Such a medium may take many forms, including but not limited to storage media and transmission media. Storage media includes both non-volatile media and volatile media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A scan device comprising:
a scan module that is configured to cause an electronic version of a printed document to be generated at the scan device;
a scan ticket templates manager that is configured to manage scan ticket template data that is stored in storage and that corresponds to a plurality of scan ticket templates, wherein:
each scan ticket template of the plurality of scan ticket templates corresponds to a different set of default settings that are used by the scan device to indicate how the scan device is to scan a printed document, and
each of two or more of the plurality of scan ticket templates corresponds to a different document type;
a scan ticket handler;
wherein the scan module is further configured to:
receive, from a first client device via a network, a first request for at least a first portion of the scan ticket template data, and
in response to the first request, send the first request to the scan ticket handler; scan ticket templates manager;
receive, from a second client device via the network, a second request for at least a second portion of the scan ticket template data, and
in response to the second request, cause the second request to be sent to the scan ticket templates manager;
wherein the scan ticket handler is configured to call the scan ticket templates manager in response to receiving the first request;
wherein the scan ticket templates manager is further configured to:

in response to the first request:
retrieve a first portion of the scan ticket template data from the storage, wherein the first portion corresponds to one or more first scan ticket templates of the plurality of scan ticket templates, and
send the first portion to the scan ticket handler; and
in response to the second request:
retrieve a second portion of the scan ticket template data from the storage, wherein the second portion corresponds to one or more second scan ticket templates of the plurality of scan ticket templates, and
wherein the scan ticket handler is further configured to, in response to receiving the first portion, serialize the first portion in a defined format and send the serialized first portion to the scan module;
cause the second portion to be sent to the scan module; and
wherein the scan module is further configured to:
send the serialized first portion over the network to the first client device, and
send the second portion over the network to the second client device.

2. The scan device of claim 1, wherein a different document type includes one of: a text document, a photograph, a postcard, or a passport.

3. The scan device of claim 1, wherein for each scan ticket template of a subset of the plurality of scan ticket templates, said each scan ticket template includes settings values for the following settings parameters: color, resolution, and scale.

4. The scan device of claim 1, wherein the scan ticket templates manager is further configured to, in response to user input:
create one or more scan ticket templates; or
update one or more of the plurality of scan ticket templates.

5. The scan device of claim 1, wherein the first request is for all scan ticket templates managed by the scan device and the second request specifies the one or more second scan ticket templates of the plurality of scan ticket templates.

6. The scan device of claim 1, wherein each scan ticket template of the plurality of scan ticket templates is based on one or more capabilities of the scan device.

7. The scan device of claim 1, wherein the scan module is further configured to:
implement a Web Services (WS) scan specification;
receive, from the first client, a scan job that (1) includes a scan ticket that is based on a scan ticket template that is included in the first portion and (2) is generated by the first client.

8. The scan device of claim 1, wherein the scan ticket templates manager is further configured to, in response to a change in one or more capabilities of the scan device, create one or more scan ticket templates that reflect the current capabilities of the scan device.

9. A scan device comprising:
a scan module that is configured to cause an electronic version of a printed document to be generated at the scan device;
a scan ticket templates manager that is configured to manage scan ticket template data that is stored in storage and that corresponds to a plurality of scan ticket templates, wherein:
each scan ticket template of the plurality of scan ticket templates corresponds to a different set of default settings that are used by the scan device to indicate how the scan device is to scan a printed document, and
each of two or more of the plurality of scan ticket templates corresponds to a different document type;
a scan ticket handler;
wherein the scan module is further configured to:
receive a request for at least a portion of the scan ticket template data, and in response to the request, send the request to the scan ticket handler;
wherein the scan ticket handler is configured to call the scan ticket templates manager in response to receiving the request;
wherein the scan ticket templates manager is further configured to:
in response to the request:
retrieve a portion of the scan ticket template data from the storage, wherein the portion corresponds to one or more scan ticket templates of the plurality of scan ticket templates, and
send the portion to the scan ticket handler; and
wherein the scan ticket handler is further configured to, in response to receiving the portion, serialize the portion in a defined format and send the serialized portion to the scan module;
wherein the scan module is further configured to send the serialized portion in response to the request;
wherein the scan ticket templates manager is further configured to, in response to a change in one or more capabilities of the scan device, create one or more scan ticket templates that reflect current capabilities of the scan device.

10. The scan device of claim 9, wherein:
the request is received, over a network, from a first client device that is different than a second client device;
the scan module is further configured to:
receive, from the second client device via the network, a second request for at least a second portion of the scan ticket template data, and
in response to the second request, cause the second request to be sent to the scan ticket templates manager;
the scan ticket templates manager is further configured to:
in response to the second request:
retrieve a second portion of the scan ticket template data from the storage, wherein the second portion corresponds to one or more second scan ticket templates of the plurality of scan ticket templates, and
cause the second portion to be sent to the scan module; and
the scan module is further configured to send the second portion over the network to the second client device.

11. The scan device of claim 9, wherein the different document type includes one of: a text document, a photograph, a postcard, or a passport.

12. The scan device of claim 9, wherein for each scan ticket template of a subset of the plurality of scan ticket templates, said each scan ticket template includes settings values for the following settings parameters: color, resolution, and scale.

13. The scan device of claim 9, wherein the scan ticket templates manager is further configured to, in response to user input:
create one or more scan ticket templates; or
update one or more of the plurality of scan ticket templates.

14. The scan device of claim 9, wherein the request (a) is for all scan ticket templates managed by the scan device or (b) specifies the one or more scan ticket templates of the plurality of scan ticket templates.

15. The scan device of claim 9, wherein each scan ticket template of the plurality of scan ticket templates is based on one or more capabilities of the scan device.

16. The scan device of claim 9, wherein the scan module is further configured to:

implement a Web Services (WS) scan specification;

receive, over a network, from a client device that is different than the scan device, a scan job that (1) includes a scan ticket that is based on a scan ticket template that is included in the portion and (2) is generated by the client device.

17. One or more non-transitory storage media storing instructions which, when executed by one or more processors, cause:

sending, from a client device over a network to a first scan device, a first request for scan ticket template data;

after sending the first request, receiving, from the first scan device at the client device, first scan ticket template data, wherein the first scan ticket template data includes one or more first scan ticket templates that includes a first scan ticket template, each of which identifies a particular document type;

sending, from the client device over the network to a second scan device that is different than the first scan device, a second request for scan ticket template data;

after sending the second request, receiving, from the second scan device at the client device, second scan ticket template data that is different than the first scan ticket template data, wherein the second scan ticket template data includes a plurality of second scan ticket templates that includes a second scan ticket template and that are based on current capabilities of the second scan device, wherein each scan ticket template of the plurality of second scan ticket templates identifies a document type to which said each scan ticket template belongs;

selecting, at the client device, the first scan ticket template;

creating, at the client device, a first scan job based on the first scan ticket template;

sending, from the client device to the first scan device, the first scan job;

selecting, at the client device, the second scan ticket template;

creating, at the client device, a second scan job based on the second scan ticket template;

sending, from the client device to the second scan device, the second scan job.

\* \* \* \* \*

UNITED STATES PATENT AND TRADEMARK OFFICE
CERTIFICATE OF CORRECTION

PATENT NO. : 8,482,765 B2  
APPLICATION NO. : 12/340668  
DATED : July 9, 2013  
INVENTOR(S) : Yuwen Wu and Yi Ding Page 1 of 1

It is certified that error appears in the above-identified patent and that said Letters Patent is hereby corrected as shown below:

In the Claims:

Column 10  
Claim 1: Lines 55-56: Delete "scan ticket templates manager;".

Column 11  
Claim 1: Line 11-17: Delete "templates, and wherein the scan ticket handler is further configured to, in response to receiving the first portion, serialize the first portion in a defined format and send the serialized first portion to the scan module; cause the second portion to be sent to the scan module; and" and insert --templates, and  
  cause the second portion to be sent to the scan module; and  
  wherein the scan ticket handler is further configured to, in response to receiving the first portion,  
    serialize the first portion in a defined format and send the serialized first portion to the scan  
    module;--.

Signed and Sealed this  
Sixth Day of August, 2013

Teresa Stanek Rea  
*Acting Director of the United States Patent and Trademark Office*